(12) United States Patent
Kwon et al.

(10) Patent No.: US 9,879,775 B2
(45) Date of Patent: Jan. 30, 2018

(54) SHIFTING LEVER ASSEMBLY

(71) Applicant: SL Corporation, Daegu (KR)

(72) Inventors: Keehwan Kwon, Daegu (KR); Suntae Jung, Daegu (KR); Wonhun Jung, Daegu (KR); Junghoon Kang, Daegu (KR); Sangkook Kang, Daegu (KR); Jueun Shin, Daegu (KR)

(73) Assignee: SL Corporation, Daegu (KR)

( * ) Notice: Subject to any disclaimer, the term of this patent is extended or adjusted under 35 U.S.C. 154(b) by 327 days.

(21) Appl. No.: 14/940,774

(22) Filed: Nov. 13, 2015

(65) Prior Publication Data
US 2017/0138463 A1 May 18, 2017

(51) Int. Cl.
*F16H 59/00* (2006.01)
*F16H 59/10* (2006.01)
*G01D 5/14* (2006.01)

(52) U.S. Cl.
CPC .......... *F16H 59/105* (2013.01); *G01D 5/145* (2013.01)

(58) Field of Classification Search
CPC .............................. F16H 59/105; G01D 5/145
USPC ..................................................... 74/473.33
See application file for complete search history.

(56) References Cited

U.S. PATENT DOCUMENTS

| | | | | |
|---|---|---|---|---|
| 4,519,266 A * | 5/1985 | Reinecke | ............... | F16H 59/044 116/DIG. 20 |
| 6,530,293 B1 * | 3/2003 | Ruckert | ............... | F16H 59/105 324/207.23 |
| 6,761,081 B2 * | 7/2004 | Kliemannel | ............... | F16H 59/044 74/335 |
| 7,019,516 B2 * | 3/2006 | Tokunaga | ............... | G01D 5/145 324/207.22 |
| 7,552,659 B2 * | 6/2009 | Komatsu | ............... | F16H 59/105 74/335 |
| 8,655,615 B2 * | 2/2014 | Mehnert | ............... | G01D 5/145 702/78 |
| 8,896,297 B2 * | 11/2014 | Itomi | ............... | G01D 5/145 324/207.12 |
| 9,322,671 B2 * | 4/2016 | Servel | ............... | G01D 5/145 |
| 9,523,744 B2 * | 12/2016 | Kim | ............... | G01D 5/145 |
| 2008/0078604 A1 * | 4/2008 | Ersoy | ............... | F16H 59/044 180/336 |
| 2012/0176070 A1 * | 7/2012 | Wallrafen | ............... | G01D 3/0365 318/400.04 |
| 2013/0024156 A1 * | 1/2013 | Servel | ............... | F16H 59/70 702/150 |

(Continued)

*Primary Examiner* — Victor L MacArthur
(74) *Attorney, Agent, or Firm* — Mintz Levin Cohn Ferris Glovsky and Popeo, P.C.; Kongsik Kim

(57) ABSTRACT

A shifting lever assembly is provided and includes a shifting lever rotated about a predetermined angle of a rotation axis to select a shift stage, a magnet disposed on the rotation axis to rotate integrally with the shifting lever, and a shifting lever position detection unit coupled adjacent to the magnet that detects a magnetic force based on a rotation of the shifting lever. Further the shifting lever position detection unit includes a circuit board, first and second magnetic force sensors, installed on a first surface of the circuit board, and a third magnetic force sensor, installed on a second surface of the circuit board. Each of the three magnetic force sensor includes a magnetic force detector for detecting a force of the magnet. The magnetic force detectors of the first and second magnetic force sensors are arranged to be symmetrical to the rotation axis.

9 Claims, 9 Drawing Sheets

(56) References Cited

U.S. PATENT DOCUMENTS

| 2014/0067301 A1* | 3/2014 | Mehnert | G01D 5/145 |
| | | | 702/78 |
| 2015/0159989 A1* | 6/2015 | Kim | G01R 33/072 |
| | | | 324/207.2 |
| 2017/0138463 A1* | 5/2017 | Kwon | F16H 59/105 |

* cited by examiner

SHIFTING LEVER ASSEMBLY

TECHNICAL FIELD

The present invention relates to a shifting lever assembly, and more particularly, for allowing a driver of a vehicle to select a shift stage.

RELATED ART

Generally, to provide a vehicle speed adjustment ranging from low speed to high speed an engine is typically required to have a revolution per minute (RPM) within a certain range. For example, a vehicle is generally equipped with a transmission for changing the rotational speed of driving wheels while changing a gear ratio for the engine RPM. Additionally, the transmission for a vehicle has a function of moving the vehicle in a backward direction by reversely transmitting the output of the engine. A driver may adjust the gear ratio by selecting a shift stage by operating a knob disposed proximate to the driver's seat.

The transmission is classified into a manual transmission or an automatic transmission. Manual transmissions typically allow, the driver to directly select a shift stage such as stage one, stage two, stage three, stage four and the like in accordance with the traveling velocity of the vehicle. Automatic transmissions include an electronic control unit (ECU) of the vehicle that automatically controls the shift stage according to the traveling velocity of the vehicle, an engine load, the opening amount of a throttle valve and the like.

The automatic transmission includes, as shift stages, a parking or stopping stage (P stage), a stage to be used when moving the vehicle forward (D stage), a stage to be used when moving the vehicle backward (R stage), and a stage to block the transfer of the output of the engine to the driving wheels (N stage).

Current vehicle production utilizes a method including, the driver selects the shift stage by operating the knob, sensing a change in the position of the shifting lever connected to the knob, and controlling the transmission via the electronic control. As the vehicle safety standards are enhanced, two or more sensors for sensing the position of the shifting lever are typically used. As the number of sensors for sensing the position of the shifting lever increases, a physical space for installing the sensors increases, which may result in a reduction in sensitivity of the sensor.

SUMMARY

The present invention provides a shifting lever assembly for accurately and reliably detecting the position of a shifting lever. According to an exemplary embodiment a shifting lever assembly may include a shifting lever that rotates around a rotation axis within a predetermined angle range to select one of a plurality of shift stages, a magnet disposed on the rotation axis to rotate (e.g., integrally) with the shifting lever, and a shifting lever position detection unit coupled adjacent to the magnet to detect a change in magnetic force of the magnet according to a rotation amount of the shifting lever. The shifting lever position detection unit may include a circuit board, a first magnetic force sensor and a second magnetic force sensor, that may be installed on a first surface of the circuit board. Additionally, a third magnetic force sensor may be installed on a second surface of the circuit board. Further each of the first magnetic force sensor the second magnetic force sensor and the third magnetic force sensor may include a magnetic force detector for detecting a magnetic force of the magnet. The magnetic force detector of the first magnetic force sensor and the magnetic force detector of the second magnetic force sensor may be arranged symmetrically with respect to the rotation axis.

In some exemplary embodiments, the magnetic force detector of the third magnetic force sensor may be disposed on the rotation axis. Each of the first magnetic force sensor, the second magnetic force sensor and the third magnetic force sensor may further include a die for modulating an output value of the magnetic force detector to a Pulse Width Modulation (PWM) signal. In other exemplary embodiments, the sum of a duty ratio of the PWM signal outputted from the die of the first magnetic force sensor and a duty ratio of the PWM signal outputted from the die of the second magnetic force sensor may be constant. The duty ratio of the PWM signal outputted from the die of the third magnetic force sensor may be less than one of the duty ratio of the PWM signal that may be an output from the die of the first magnetic force sensor and the duty ratio of the PWM signal that may be an output from the die of the second magnetic force sensor.

In another exemplary embodiment, the circuit board may be spaced apart (e.g., separated) from the magnet such that the a first surface faces the magnet. A separation (e.g., spacing) distance between the magnet and the circuit board may be set such that a surface magnetic flux density of the magnet measured by the first magnetic force sensor and the second magnetic force sensor may be equal to or less than a first reference value. The surface magnetic flux density measured by the third magnetic force detector may be equal to or greater than a second reference value. In some exemplary embodiments, the first reference value may be greater than the second reference value.

In some exemplary embodiments, the rotation axis may be formed perpendicular to a longitudinal direction (e.g., axis) of the shifting lever, and the magnet may be positioned at a first side of the shifting lever. The rotation axis may be formed with respect (e.g., in a direction identical) to a longitudinal direction of the shifting lever, and the magnet may be positioned at a lower end (e.g., distal end) of the shifting lever. Embodiments of the present invention provide improved accuracy and reliability in of detection of the position of a shifting lever.

BRIEF DESCRIPTION OF THE DRAWINGS

The above and other aspects and features of the present disclosure will be apparent from the following detailed description when taken in conjunction with the accompanying drawings.

DETAILED DESCRIPTION

Figure 1:
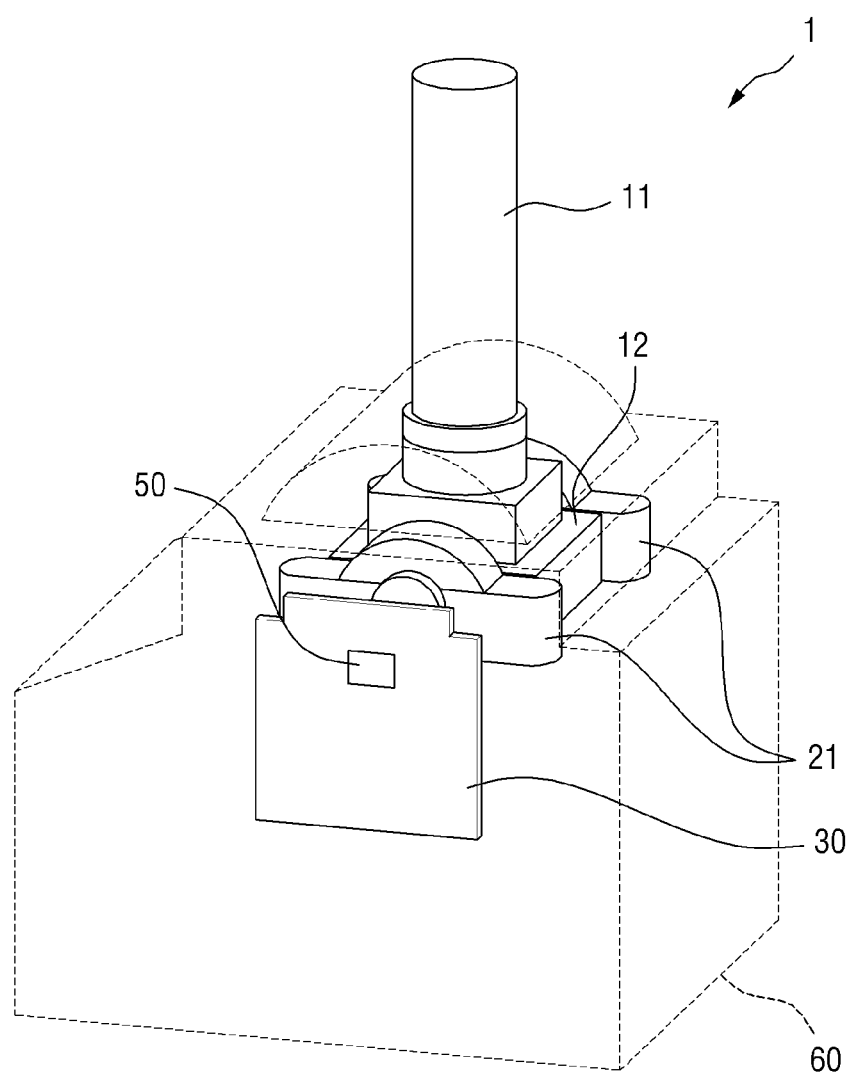
FIG. 1 is an exemplary internal perspective view schematically showing a shifting lever assembly according to an exemplary embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. However, it is to be understood that the invention is intended to cover not only the exemplary embodiments but also various modifications, equivalents, and substitutions included in the spirit and the scope of the invention as defined by the appended claims.

In the drawings, the thickness of layers and regions are exaggerated for clarity. Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation. Throughout the specification, like reference numerals in the drawings denote like elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, a shifting lever assembly according to exemplary embodiments of the present invention will be described with reference to the drawings. FIG. 1 is an internal perspective view schematically showing a shifting lever assembly according to an exemplary embodiment. As shown in FIG. 1, a shifting lever assembly 1 according to an embodiment of the present invention may include a housing 60, a support base 21 that may be installed within the housing 60, a rotation base 12, a shifting lever detection unit 30 and 40, and a shifting lever 11, a portion of which may extend (e.g., protrudes) outward from the housing 60. The housing 60 may be disposed (e.g., installed) within a center console between a driver's seat and a passenger seat of a vehicle. The housing 60 may be disposed (e.g., installed) so as not to be exposed to the interior of the vehicle. However a portion of the housing, or all of the housing 60 may be installed so as to be exposed to the interior of the vehicle according to the type of the vehicle.

A portion of the shifting lever 11 that may protrude outward from the housing 60 may be coupled to a knob (not shown). The knob may include a portion to be gripped (e.g., grasped) by the driver to operate the shifting lever 11. The driver may move the knob forward or backward to select a shift stage such as P, R, N, and D stages. The driver may interpret the operation as moving the knob forward or backward, but the shifting lever 11 may be rotated around a rotation axis A as shown in FIG. 2 according to the movement of the knob.

Figure 2:
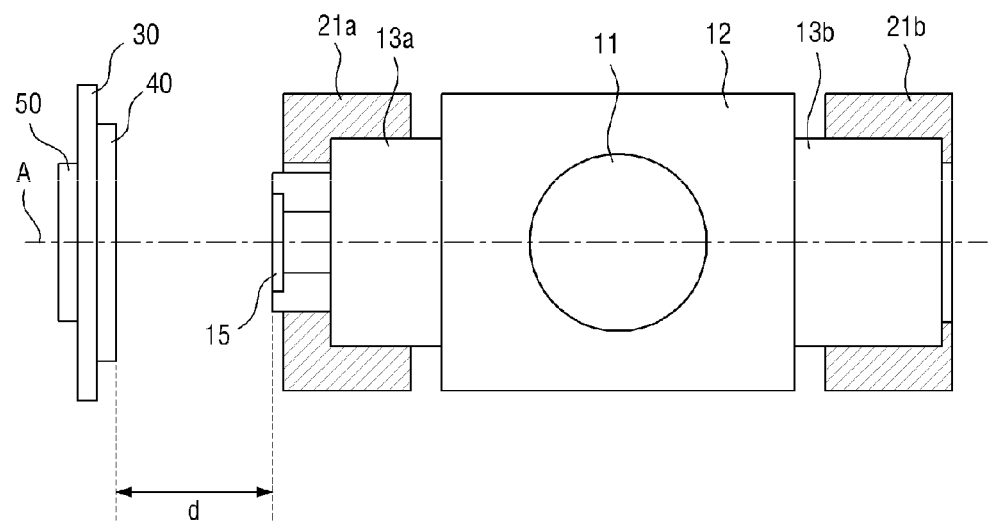
FIG. 2 is an exemplary plan view schematically showing an internal configuration of a shifting lever assembly according to an exemplary embodiment of the present invention.

FIG. 2 is an exemplary plan view schematically showing an internal configuration of a shifting lever assembly. As shown in FIGS. 1 and 2, the shifting lever 11 may be coupled to the rotation base 12 to extend from the top (e.g., proximal portion) of the rotation base 12.

A first boss 13a and a second boss 13b may be formed to protrude at the opposite sides of the rotation base 12. A pair of support bases 21a and 21b may rotatably support the first boss 13a and the second boss 13b, respectively. The pair of support bases 21a and 21b may be coupled within the housing 60. The rotation base 12 may be disposed to translate rotatably around the rotation axis A thereby passing through the centers of the first boss 13a and the second boss 13b. A magnet 15 may be installed at a first side of the first boss 13a. The magnet 15 may be preferably provided such that the center of the magnet 15 may be disposed on the rotation axis A. The magnet 15 may rotate integrally with the shifting lever 11 and the rotation base 12.

Furthermore, as shown in FIGS. 1 and 2, the shifting lever detection unit 30, 40 and 50 may be installed adjacent to the magnet 15. The shifting lever detection unit 30, 40 and 50 may include a circuit board 30, a first detection unit 40 and a second detection unit 50. The circuit board 30 may include a circuit printed board configured to drive the first detection unit 40 and the second detection unit 50. The circuit board 30 may be configured to provide power to the first detection unit 40 and the second detection unit 50, and may be configured to output signals and the like from the first detection unit 40 and the second detection unit 50.

As shown in FIG. 2, the circuit board 30 may be provided substantially perpendicular to the rotation axis A such that a first surface of the circuit board 30 may be positioned opposite to (e.g., faces) the magnet 15. The first detection unit 40 may be provided on a first surface of the circuit board 30, and the second detection unit 50 may be provided on a second surface of the circuit board 30. The first detection unit 40 and the second detection unit 50 may be configured detect a magnetic force that may be adjusted when the magnet 15 may be rotated along with the rotation of the shifting lever 11.

Figure 3:
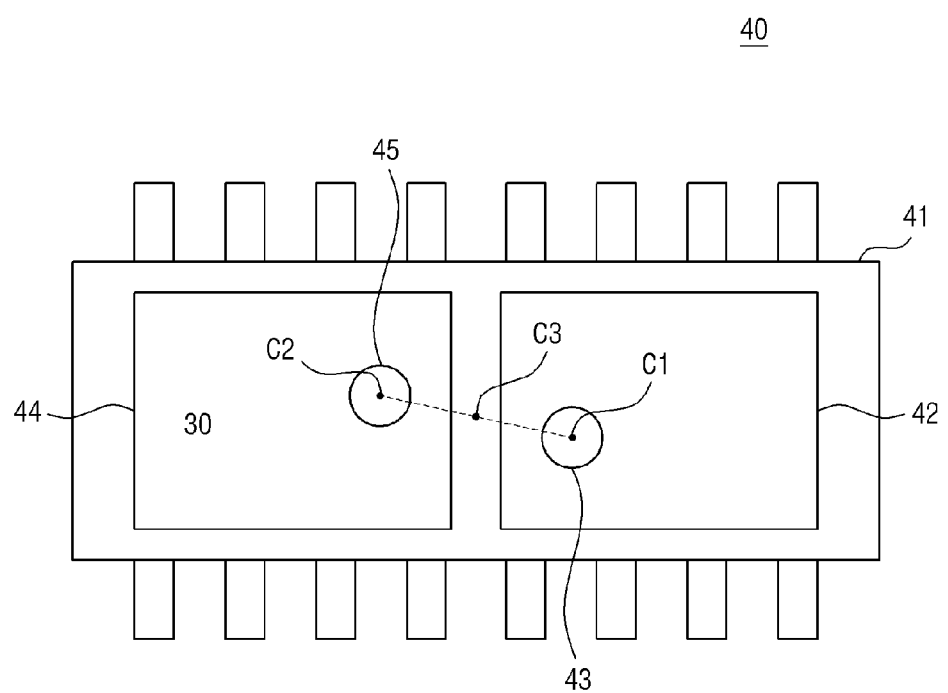
FIG. 3 is an exemplary plan view schematically illustrating the first detection unit of the shifting lever assembly according to the exemplary embodiment of the present invention.

FIG. 3 is an exemplary plan view schematically illustrating the first detection unit of the shifting lever assembly. As shown in FIG. 3, the first detection unit 40 may include a first bed 41 that may be installed on a first surface of the circuit board 30, a first magnetic force sensor 42 and 43 that may be installed on the first bed 41, and a second magnetic force sensor 44 and 45 that may be installed on the first bed 41.

The first bed 41 may be electrically connected (e.g., coupled) to the circuit board 30 and may transmit the power required for driving the first magnetic force sensor 42 and 43 and the second magnetic force sensor 44 and 45. Additionally the first bed 41 may transmit a signal and the like outputted from the first magnetic force sensor 42 and 43 and the second magnetic force sensor 44 and 45 to the circuit board 30. The first magnetic force sensor 42 and 43 may include a first die 42 and a first magnetic force detector 43.

The first magnetic force detector 43 may be configured to detect the magnetic force of the magnet 15. For example, the first magnetic force detector 43 may include a magnetic force detector such as an integrated magnetic concentrator (IMC). The IMC may detect a magnetic force by converting a magnetic force into a voltage signal using a hall effect that may generate an electromotive force in the vertical direction using a horizontal component of the magnetic field. The first die 42 may be configured to modulate an output value of the first magnetic force detector 43 to a pulse width modulation (PWM) signal.

The second magnetic force sensor 44 and 45 may include a second die 44 and a second magnetic force detector 45. Since the functions of the second die 44 and the second magnetic force detector 45 may be similar to those of the first die 42 and the first magnetic force detector 43, respectively, a description thereof will be omitted. The first magnetic force detector 43 and the second magnetic force detector 45 may be arranged to be substantially symmetrical with respect to the rotation axis A. Specifically, a middle point C3 that may be positioned between a center point C1 of the first magnetic force detector 43 and a center point C2 of the second magnetic force detector 45 may be disposed on the rotation axis A. In some exemplary embodiments the first magnetic force sensor 42 and 43 and the second magnetic force sensor 44 and 45 may have a similar structure, and the second magnetic force sensor 44 and 45 may be configured by rotating the first magnetic force sensor 42 and 43 by about 180 degrees around the rotation axis A.

Figure 4:
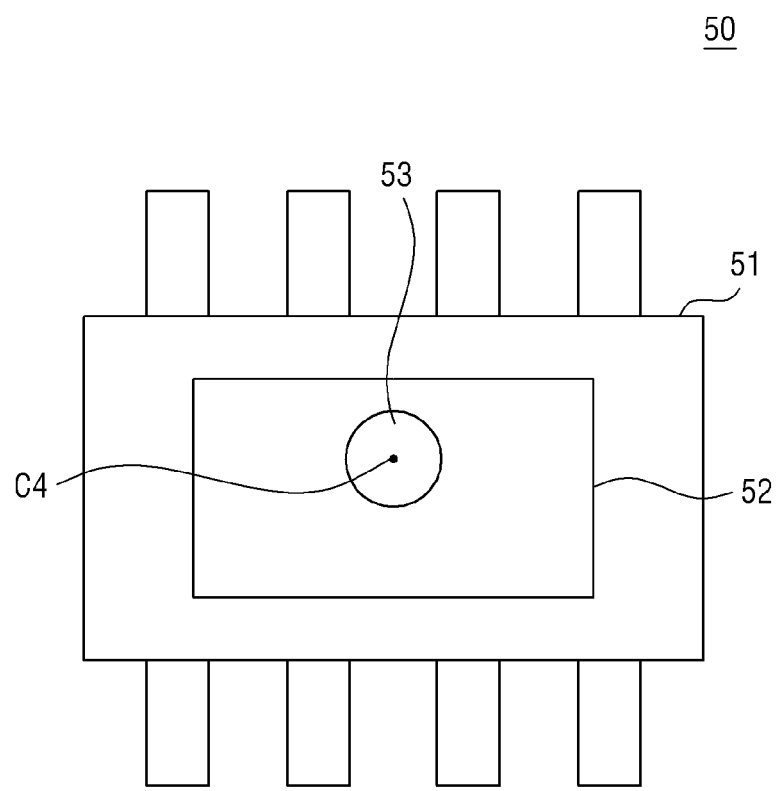
FIG. 4 is an exemplary plan view schematically illustrating the second detection unit of the shifting lever assembly according to the exemplary embodiment of the present invention.

Moreover, FIG. 4 is an exemplary plan view schematically illustrating the second detection unit of the shifting lever assembly. As shown in FIG. 4, the second detection unit 50 may include a second bed 51 that may be disposed on a second surface of the circuit board 30, and a third magnetic force sensor 52 and 53 that may be disposed on the second bed 51. The second bed 51 may be electrically connected to the circuit board 30 and may transmit the power required for driving the third magnetic force sensor 52 and 53. Alternatively, the second bed 51 may transmit a signal and the like outputted from the third magnetic force sensor 52 and 53 to the circuit board 30.

The third magnetic force sensor 52 and 53 may include a third die 52 and a third magnetic force detector 53. The third magnetic force detector 53 may detect a magnetic force of the magnet 15 disposed on the rear surface of the circuit board 30. The third die 52 may be configured to modulate an output value of the third magnetic force detector 53 to a pulse width modulation (PWM) signal. The third magnetic force detector 53 may be arranged such that a center point C4 may be disposed on the rotation axis A.

Figure 5:
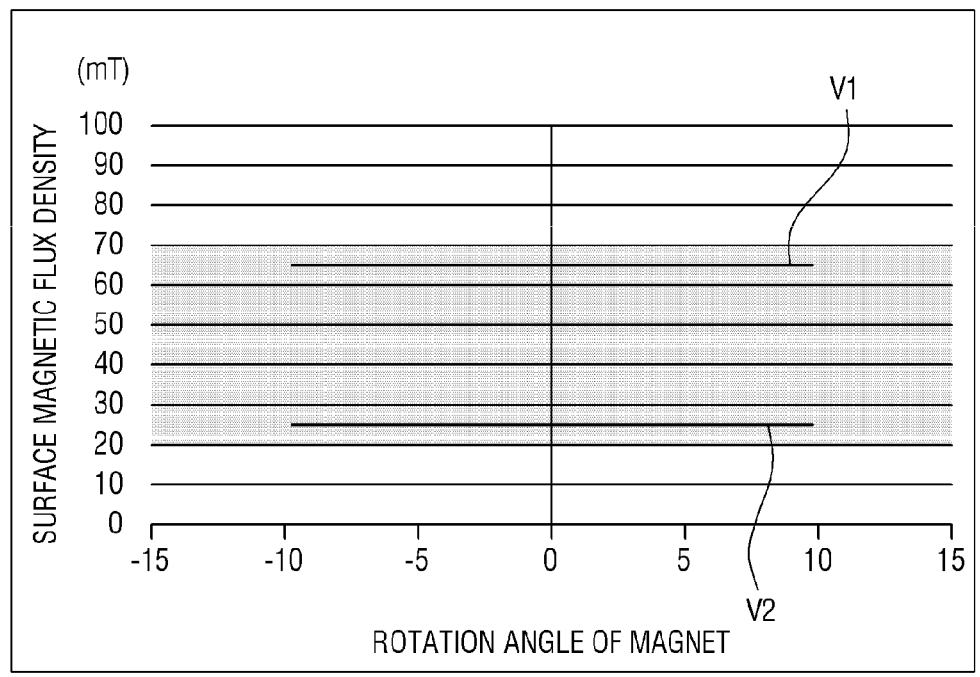
FIG. 5 is an exemplary diagram showing an example of surface magnetic flux density distribution measured by the magnetic force detectors of the shifting lever assembly according to the exemplary embodiment of the present invention.

As shown, FIG. 5 is an exemplary diagram showing an example of surface magnetic flux density distribution measured by the magnetic force detectors of the shifting lever assembly. The first magnetic force detector 43 and the second magnetic force detector 45 may be arranged to be sustainably symmetrical with respect to the rotation axis A on a first surface of the circuit board 30. Additionally, the distance from the first magnetic force detector 43 to the magnet 15 may be substantially the same as the distance from the second magnetic force detector 45 to the magnet 15. Thus, the surface magnetic flux density that may be measured by the first magnetic force detector 43 and the surface magnetic flux density that may be measured by the second magnetic force detector 45 may exhibit substantially the same distribution V1.

However, since the third magnetic force detector 53 may be disposed on the rear (e.g., back) surface of the circuit board 30, the distance to the magnet 15 from the third magnetic force detector 53 may be greater (e.g., increased) than the distance to the magnet 15 from each of the first magnetic force detector 43 and the second magnetic force detector 45. Therefore, as shown in FIG. 5, the surface magnetic flux density that may be measured by the third magnetic force detector 53 may exhibit a distribution V2 that may be lower (e.g., less) than the surface magnetic flux density distribution V1 that may be measured by the first magnetic force detector 43 and the second magnetic force detector 45.

The surface magnetic flux density distribution V1 that may be measured by the first magnetic force detector 43 and the second magnetic force detector 45 and the surface magnetic flux density distribution V2 that may be measured by the third magnetic force detector 53 may vary. The variance may be based on a spacing distance d between the shifting lever detection unit 30, 40 and 50 and the magnet 15. In other words, on the assumption that factors, such as a diameter and a thickness, of the magnet are constant, as the spacing distance d increases, the surface magnetic flux density distributions V1 and V2 may become lower.

For example excessively high or low surface magnetic flux density distributions V1 and V2 may increase the difficulty for the magnetic force detectors 43, 45 and 53 to sensitively detect a change in magnetic force due to the rotation of the magnet 15. The surface magnetic flux density distributions V1 and V2 may be between., a second reference value (e.g., about 20 mT) and a first reference values (e.g., about 70 mT). The magnetic force detectors 43, 45 and 53 may sensitively detect a change in magnetic force due to the rotation of the magnet 15.

Thus, the spacing distance d between the shifting lever detection unit 30, 40 and 50 and the magnet 15 may be formed such that the surface magnetic flux density distribution V1 measured by the first magnetic force detector 43 and the second magnetic force detector 45 may be equal to or less than the first reference value (e.g., about 70 mT). Further, the surface magnetic flux density distribution V2 measured by the third magnetic force detector 53 may be equal to or greater than the second reference value (e.g., about 20 mT).

Figure 6:
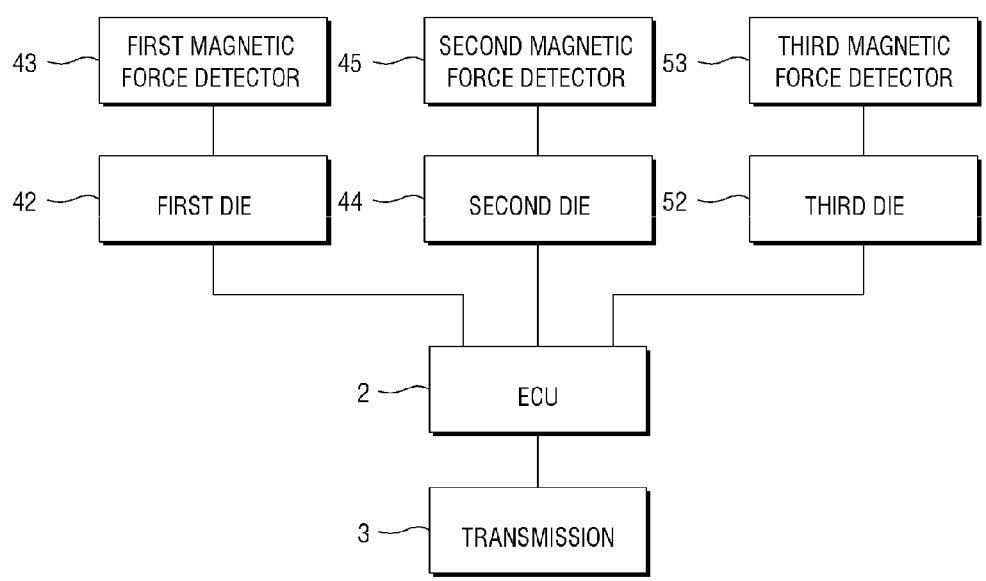
FIG. 6 is an exemplary block diagram showing an automotive transmission according to an exemplary embodiment of the present invention.

FIG. 6 is an exemplary block diagram showing an automotive transmission according to an exemplary embodiment. The automotive transmission may include a control unit 2 and a transmission 3 in addition to the shifting lever assembly 1 described above. The control unit 2 may be an electronic control unit (ECU) for controlling a vehicle transmission. The ECU 2 may be an electronic control unit configured to collectively control a driving system, a brake system and a steering system of the vehicle in addition to controlling the transmission. The transmission 3 may adjust the rotational speed of driving wheels while it may adjust a gear ratio, and may be classified into a 5-speed transmission, a 6-speed transmission and the like according to types of gear ratios. Recently, high-stage transmissions have been developed that may include 8 or more gear ratios.

The first magnetic force detector 43, the second magnetic force detector 45 and the third magnetic force detector 53 may detect a magnetic force of the magnet 15 at different points. Further, the magnet 15 may be rotated together with the shifting lever 11 the magnetic force of the magnet 15 may be detected by the first magnetic force detector 43, the second magnetic force detector 45 and the third magnetic force detector 53 and may be adjusted in accordance with the position of the shifting lever 11.

Figure 7:
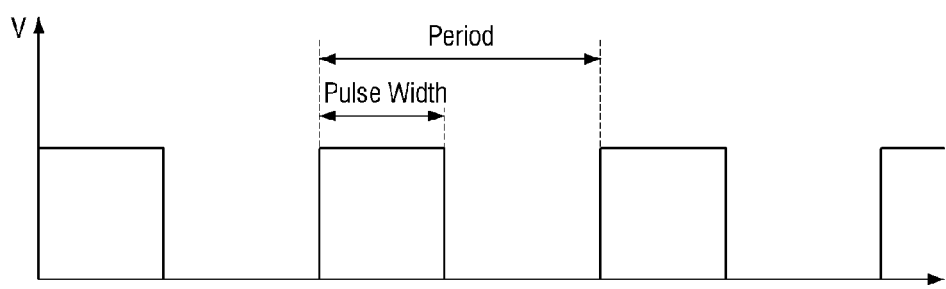
FIG. 7 is an exemplary graph showing an example of a PWM signal according to an exemplary embodiment of the present invention.

The first die 42, the second die 44 and the third die 52 may modulate the output values of the first magnetic force detector 43, the second magnetic force detector 45 and the third magnetic force detector 53 to generate signals that may be recognizable by the ECU 2, respectively. For example, the first die 42, the second die 44 and the third die 52 may modulate the output values of the first magnetic force detector 43, the second magnetic force detector 45 and the third magnetic force detector 53 to PWM control signals, respectively, as shown in FIG. 7. The first die 42, the second die 44 and the third die 52 may output PWM control signals whose duty cycle (e.g., about a pulse width*100/period) may be controlled based on the output values of the first magnetic force detector 43, the second magnetic force detector 45, and the third magnetic force detector 53, respectively. The ECU 2 may determine the shift stage selected by the shifting lever 11 based on the PWM control signals respectively transmitted from the first die 42, the second die 44 and the third die 52, and may control the transmission 3 that may be driven to the selected shift stage.

Figure 8:
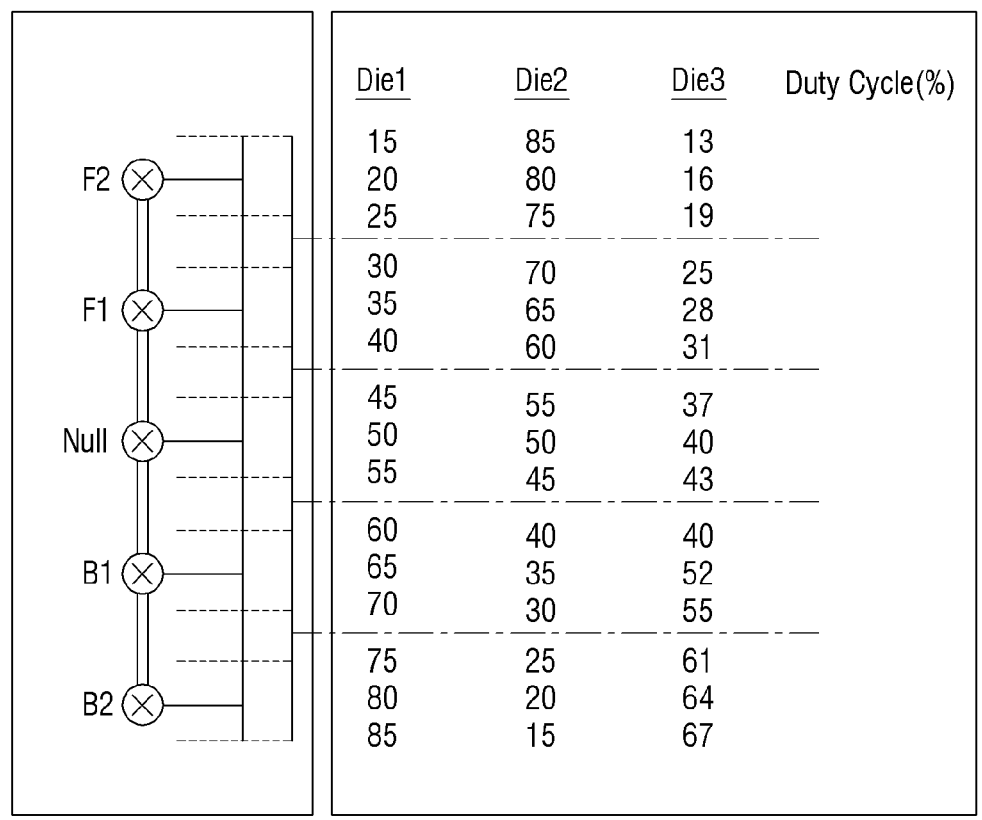
FIG. 8 is an exemplary diagram showing a relationship between the PWM signal and the position of the shifting lever of the shifting lever assembly according to the exemplary embodiment of the present invention.

FIG. 8 is an exemplary diagram showing a relationship between the PWM signal and the position of the shifting lever of the shifting lever assembly according to the exemplary embodiment. As shown in FIG. 8, the shifting lever assembly 1 may be configured such that the shifting lever 11 may move (e.g., translates) between the five shift stages (e.g., F1, F2, Null, B1, B2) to select any one shift stage. The five shift stages (e.g., F1, F2, Null, B1, B2) may be configured as P-stage, R-stage, N-stage, D-stage and L-stage in the order mentioned, or may be configured as R-stage, N-stage, D-stage and +/− of a manual mode. Alternatively, among the five shift stages (e.g., F1, F2, Null, B1, B2), three shift stages may be used as RND-stages, or four shift stages may be used as PRND-stages. Although an example in which the shifting lever 11 may be configured to select any one of the five shift stages (e.g., F1, F2, Null, B1, B2) has been illustrated in FIG. 8, the shifting lever 11 may be configured to select any one of four or three shift stages.

Hereinafter, a description will be given according to the exemplary embodiment as shown in FIG. 8, but the present invention is not limited thereto. The shifting lever 11 may rotates while moving (e.g., translating) between the five shift stages (e.g., F1, F2, Null, B1, B2), the magnet 15 may rotate around the rotation axis A. Accordingly, the magnetic field may vary based on the position of the shifting lever 11. Therefore, the magnetic force of the magnet 15 may be measured by the first magnetic force detector 43, the second magnetic force detector 45 and the third magnetic force detector 53 that may also vary based on the position of the shifting lever 11. Each of the magnetic force detectors 43, 45 and 53 may output a different output value (e.g., voltage value) based on the position of the shifting lever 11.

The first die 42, the second die 44 and the third die 52 may modulate the output values from the magnetic force detectors 43, 45 and 53 based on the position of the shifting lever 11 to PWM control signals whose duty cycles may differ, respectively.

As shown in FIG. 8, the duty cycles of the PWM control signals may be outputted from the first die 42 (e.g., Die 1) based on the position of the shifting lever 11. For example, when the shifting lever 11 may be positioned at the F1 stage, the first die 42 may out a PWM control signal that may include a duty cycle of 35%. Similarly, the duty cycles of the PWM control signals may be outputted from the second die 44 (e.g., Die 2) based on the positions of the shifting lever 11. The duty cycles of the PWM control signals may be outputted from the third die 52 (e.g., Die 3). Thus, the ECU 2 may determine the shift stage selected by the shifting lever 11, the position of the shifting lever 11 and the like based on the PWM control signals outputted from the first die 42, the second die 44 and the third die 52.

For example, the duty cycle of the PWM control signal outputted from the first die 42 may be about 65%, the duty cycle of the PWM control signal outputted from the second die 44 may be about 35%, and the duty cycle of the PWM control signal outputted from the third die 52 may be about 52%. Accordingly the ECU 2 may determine that the shift stage selected by the shifting lever 11 may be B1. Further, the duty cycle of the PWM control signal outputted from the first die 42 may be about 40%, the duty cycle of the PWM control signal outputted from the second die 44 may be about 60%, and the duty cycle of the PWM control signal outputted from the third die 52 may be about 31%. Accordingly the ECU 2 may determine that the shifting lever 11 is positioned between the F1 stage and the Null stage. In other words, since the shifting lever 11 fails to normally select the shift stage, the driver may be warned by a visual or an acoustic method.

Moreover, the ECU 2 may determine whether the magnetic force sensors 42, 43, 44, 45, 52 and 53 are operated normally based on the PWM control signals transmitted from the first die 42, the second die 44 and the third die 52, respectively. For example, the PWM control signal outputted from the first die 42 or the second die 44 may exceed a range of about 15%~85%, or the PWM control signal outputted from the third die 52 may exceed a range of about 13%~67%, the ECU 2 may determine that the magnetic force sensor corresponding to the die may be non-functional.

Alternatively, the PWM control signals transmitted from two dies among the three dies 42, 44 and 52 may be normal. However, the PWM control signal transmitted from the remaining one die may be abnormal; the ECU 2 may determine that the magnetic force sensor corresponding to the die which has transmitted the abnormal PWM control signal may be non-functional. For example, the duty cycle of the PWM control signal outputted from the first die 42 may be about 20%, the duty cycle of the PWM control signal outputted from the second die 44 may be about 50%, and the duty cycle of the PWM control signal outputted from the third die 52 may be about 16%, the PWM control signals outputted from the first die 42 and the third die 52 may mean that the shifting lever 11 may be positioned at the F2 stage. However, the PWM control signal outputted from the second die 44 may indicate that the shifting lever 11 may be positioned at the Null stage. In this case, the ECU 2 may determine that the shifting lever 11 is positioned at the F2 stage, and may determine that the second magnetic force sensor 44 and 45 that corresponds to the second die 44 may be non-functional. The ECU 2 may determine the position of the shifting lever based on the PWM control signal transmitted from the die of the magnetic force sensor other than the magnetic force sensor determined may be non-functional.

The shifting lever assembly and the automotive transmission may use the same according to the exemplary embodiment, since three magnetic force sensors 42, 43, 44, 45, 52 and 53 are used. For example, even though any one magnetic force sensor may not operate (e.g., function) normally, the shift stage selected by the shifting lever 11 may still be stably determined. Further, by arranging the three magnetic force sensors 42, 43, 44, 45, 52 and 53 disposed on the front and back of the circuit board 30 a physical space required for the arrangement of sensors may be reduced. Further, by reducing the distance between the magnet 15 and the magnetic force sensors 42, 43, 44, 45, 52 and 53, the errors of the measurement of the magnetic force may be reduced, and the accuracy to determine the shift stage selected by the shifting lever 11 may be increased.

Figure 9:
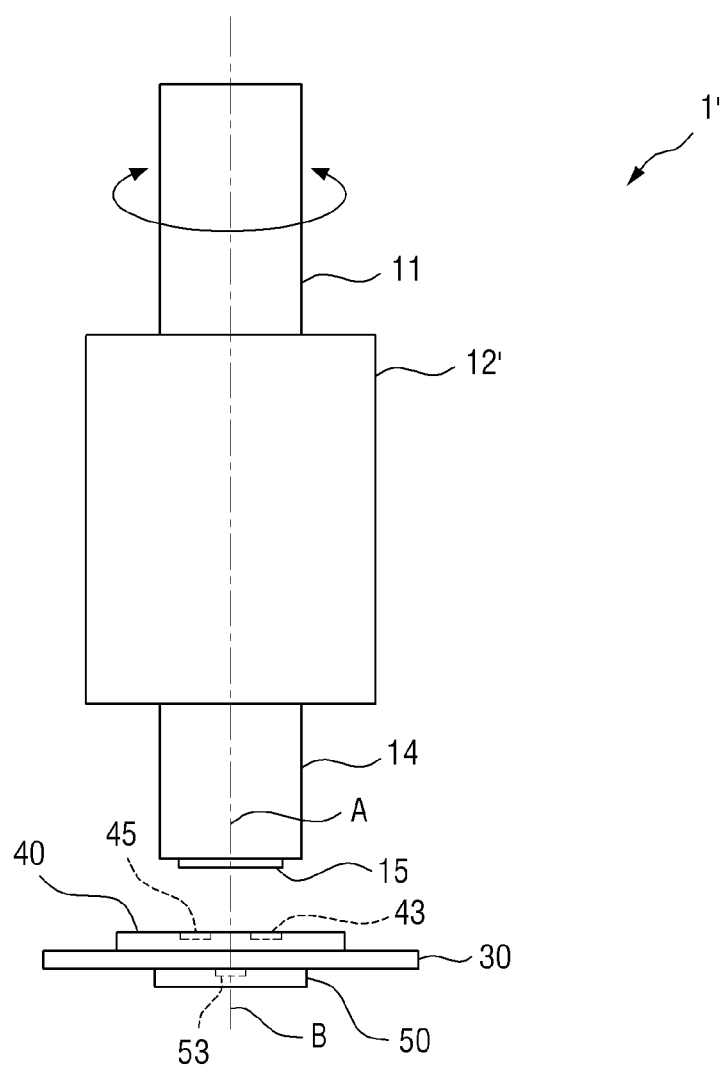
FIG. 9 is an exemplary schematic view illustrating a shifting lever assembly according to another exemplary embodiment of the present invention.

Hereinafter, a shifting lever assembly according to an exemplary embodiment will be described. For explanatory convenience, the components similar to those of the above-described embodiment are denoted by the same reference numerals, and a description thereof will be omitted. FIG. 9 is an exemplary schematic view illustrating a shifting lever assembly according to an exemplary embodiment. A shifting lever assembly 1' shown in FIG. 9 may be applied to a dial-type transmission.

As shown in FIG. 9, in the shifting lever assembly 1' may include the magnet 15 that may be disposed at the lower end (e.g., distal end) of the shifting lever 11 and 14. Further, the shifting lever 11 and 14 may be disposed (e.g., installed) on the rotation base 12, which may be coupled to be rotatable around the rotation axis A. The shifting lever 11 and 14 may include an upper component 11 that may be formed to extend upward from the rotation base 12 and a lower component 14 that may be formed to extend downward from the rotation base 12.

The magnet 15 may be disposed at the end of the lower component 14, and although not shown, a dial knob may be coupled to the end of the upper component 11. Therefore, the driver may rotate the dial knob in one direction or the other direction, the magnet 15 may be rotated around the rotation axis A along with the shifting lever 11 and 14. Further, the shifting lever detection unit 30, 40 and 50 may be disposed below the shifting lever 11. The circuit board 30 may be installed such that a first surface of the circuit board 30 may be positioned opposite to (e.g., faces) the magnet 15. The first detection unit 40 may be disposed on a first surface of the circuit board 30, and the second detection unit 50 may be disposed on a second surface of the circuit board 30.

As shown in FIG. 9, the first magnetic force detector 43 and the second magnetic force detector 45 may be disposed within the first detection unit 40, and the third magnetic force detector 53 may be disposed within the second detection unit 50. Similarly to the above-described embodiment, the first magnetic force detector 43 and the second magnetic force detector 45 may be disposed on a first surface of the circuit board 30 and may be substantially symmetrical with respect to the rotation axis A. Further, the third magnetic force detector 53 may be disposed on a second surface of the circuit board 30 to be disposed on the rotation axis A.

Unlike the configuration illustrated in FIG. 9, the first magnetic force detector 43 and the second magnetic force detector 45 may be disposed on a second surface of the circuit board 30. The third magnetic force detector 53 may be disposed on a first surface of the circuit board 30. Additionally in the shifting lever assembly 1' the magnet 15 may be rotated according to the rotation of the shifting lever 11 and 14, the magnetic force of the magnet 15 may be detected by the three magnetic force detectors 43, 45 and 53, that may be coupled, based on the rotation amount of the shifting lever 11 and 14. Although not shown in FIG. 9, the shifting lever assembly 1' may include the first die 42, the second die 44 and the third die 52 for modulating the output values of the first magnetic force detector 43, the second magnetic force detector 45 and the third magnetic force detector 53 to signals recognizable by the ECU 2.

Similarly the above-described embodiment, the ECU 2 may determine the rotation amount of the shifting lever 11 and whether the magnetic force sensor may normally operate based on the signals transmitted from the first die 42, the second die 44 and the third die 52. Thus, in order to avoid redundancy, a detailed description thereof will be omitted.

Although the present invention was described in connection with what is presently considered to be exemplary embodiments thereof. Accordingly, the present invention is not limited to the foregoing exemplary embodiments and the accompanying drawings, and therefore, a scope of the present invention is not limited to the foregoing exemplary embodiments. However, it will be apparent to those skilled in the art that exemplary embodiments may include substitutions, modifications and variations in various ways that can be made without departing from the spirit and scope of the invention as defined by the appended claims and can also belong to the scope of the present invention.

What is claimed is:

1. A shifting lever assembly comprising:
    a shifting lever which rotates around a rotation axis within a predetermined angle range to select one of a plurality of shift stages;
    a magnet which disposed on the rotation axis to rotate integrally with the shifting lever; and
    a shifting lever position detection unit coupled adjacent to the magnet to detect a change in magnetic force of the magnet according to a rotation amount of the shifting lever,
    wherein the shifting lever position detection unit includes a circuit board, a first magnetic force sensor and a second magnetic force sensor, which are installed on a first surface of the circuit board, and a third magnetic force sensor, which is installed on a second surface of the circuit board,
    wherein each of the first magnetic force sensor, the second magnetic force sensor and the third magnetic force sensor includes a magnetic force detector for detecting a magnetic force of the magnet, and
    wherein the magnetic force detector of the first magnetic force sensor and the magnetic force detector of the second magnetic force sensor are arranged to be symmetrical with respect to the rotation axis.

2. The shifting lever assembly of claim 1, wherein the magnetic force detector of the third magnetic force sensor is disposed on the rotation axis.

3. The shifting lever assembly of claim 1, wherein each of the first magnetic force sensor, the second magnetic force sensor and the third magnetic force sensor further includes a die for modulating an output value of the magnetic force detector to a Pulse Width Modulation signal.

4. The shifting lever assembly of claim 3, wherein the sum of a duty ratio of the Pulse Width Modulation signal outputted from the die of the first magnetic force sensor and a duty ratio of the Pulse Width Modulation signal outputted from the die of the second magnetic force sensor is constant.

5. The shifting lever assembly of claim 3, wherein the duty ratio of the Pulse Width Modulation signal outputted from the die of the third magnetic force sensor is less than one of the duty ratio of the Pulse Width Modulation signal outputted from the die of the first magnetic force sensor and the duty ratio of the Pulse Width Modulation signal outputted from the die of the second magnetic force sensor.

6. The shifting lever assembly of claim 1, wherein the circuit board is separated from the magnet such that the a first surface is disposed opposite to the magnet, and
    wherein a spacing distance between the magnet and the circuit board is set such that a surface magnetic flux density of the magnet measured by the first magnetic force sensor and the second magnetic force sensor is equal to or less than a first reference value, and a surface magnetic flux density measured by the third magnetic force detector is equal to or greater than a second reference value.

7. The shifting lever assembly of claim 6, wherein the first reference value is greater than the second reference value.

8. The shifting lever assembly of claim 1, wherein the rotation axis is formed perpendicular to a longitudinal direction of the shifting lever, and the magnet is positioned at one side of the shifting lever.

9. The shifting lever assembly of claim 1, wherein the rotation axis is formed in a longitudinal direction of the shifting lever, and the magnet is positioned at a lower end of the shifting lever.

* * * * *